Figures 1, 2:
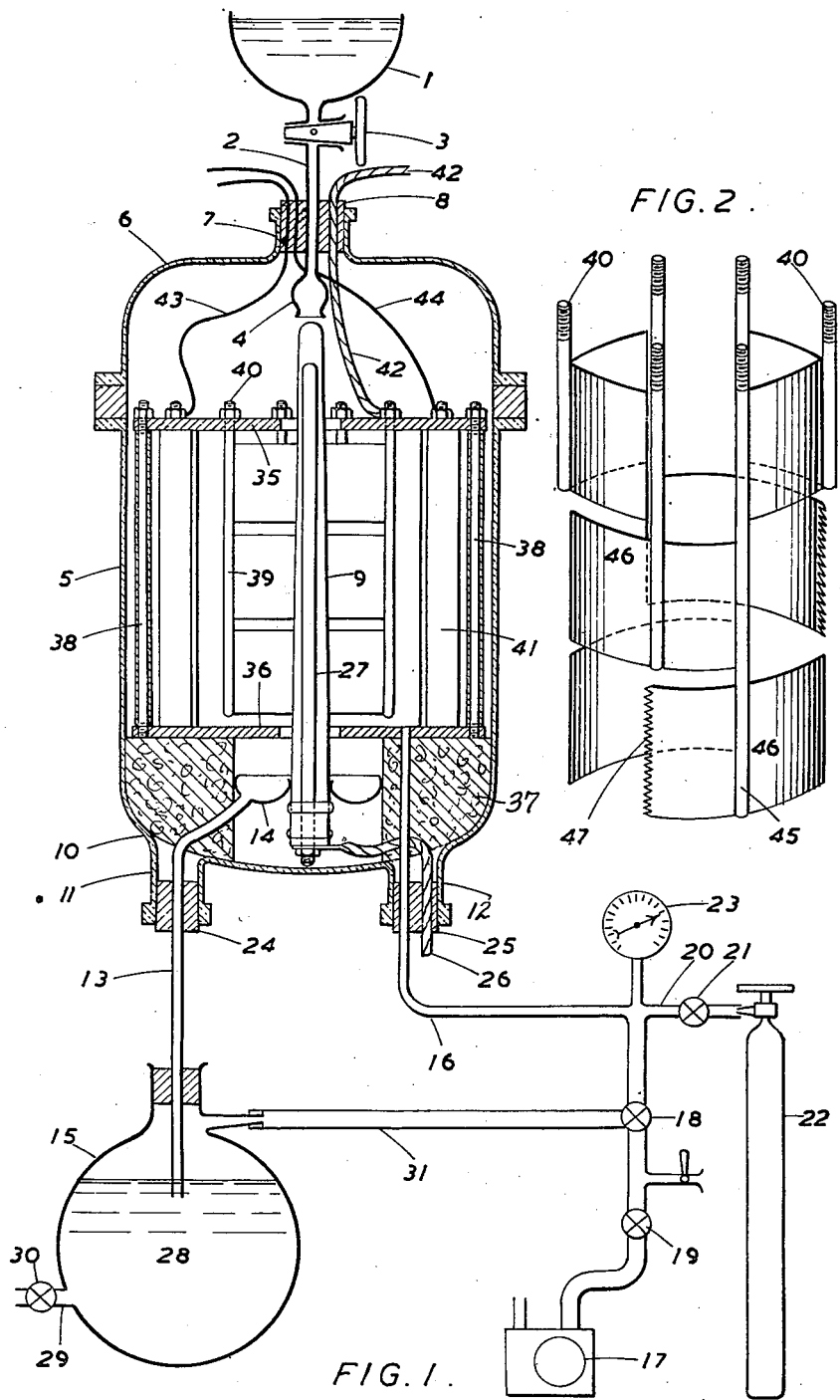

March 25, 1952    A. M. J. JANSER ET AL    2,590,323
ELECTRICAL APPARATUS
Filed Dec. 30, 1947

Inventors
ARTHUR MAGNUS JOHN JANSER
CHARLES SAMUEL TOWNSEND
By Ernest L. Mechlin
Attorney

Patented Mar. 25, 1952

UNITED STATES PATENT OFFICE 2,590,323

ELECTRICAL APPARATUS

Arthur M. J. Janser and Charles S. Townsend, London, England, assignors to Hugh Tevis, Monterey, Capetown, South Africa Application December 30, 1947, Serial No. 794,628
In Great Britain October 23, 1946

Section 1, Public Law 690, August 8, 1946
Patent expires October 23, 1966

3 Claims. (Cl. 204—312)

This invention relates to apparatus for subjecting liquid material to electrical treatment and has more especial reference to apparatus in which foodstuffs and other materials can be subjected to electro-magnetic or electro-static fields and to ionising conditions such as to effect physical or chemical changes.

Apparatus according to the present invention essentially comprises feed means for the liquid material which may be gravity or pressure operated, a treatment chamber in which the material is subjected to an electro-magnetic or electrostatic field and/or electronic or ionising conditions, and means for collecting the treated material, wherein the treatment chamber is adapted to be evacuated or be maintained at a partial pressure during the treatment and provision is also made for introducing to the treatment zone a processing gas at predetermined pressure, such as argon.

Advantageously, the feeding means includes or has associated with it devices for dispersing, suitably as a film with laminar flow, the material as it enters the treatment zone, and removable partitions of a suitable dielectric, say glass, may be furnished for use in the treatment chamber where is is desired to subject the material to electrostatic or silent or sparkless discharge conditions or to oscillating current, while yet avoiding direct contact between the electrodes and the material.

Optimum electrical, and pressure conditions are ascertained for particular materials under treatment which are conveniently colloidal solutions or dispersions more readily to flow as a continuous unbroken stream through the treatment chamber with which are associated an extraction pump controlled to maintain the predetermined pressure conditions during the course of the treatment and also means such as a valve controlled gas cylinder or cylinders from which the selected processing gas or mixture of gases is passed into the chamber after the partial extraction of residual air.

In one specific embodiment of apparatus according to the invention, a header is arranged above the treatment chamber and mounts a pair of feed hoppers by alternate successive use of which an effectively continuous flow of the liquid through the treatment chamber may be had when desired. Suitable control cocks regulate the passage of the liquid from the hoppers to the header and thence to the treatment chamber, the arrangement being such that a liquid seal is maintained in the header during the treatment, particularly when effected under sub-atmospheric pressure with a processing gas present. A similar liquid seal is maintained in the receiving vessel or receptacle placed below the treatment chamber for the processed liquid, or a similar result so far as sustaining the pressure conditions within the chamber during the treatment may be attained by the use of synchronised feed and draw off pumps.

The treatment chamber, which may be of general cylindrical shape, mounts an axial or central conduit in the form of a narrow cone down which the liquid runs during treatment and which may contain a central electrode, and surrounding this conduit or cone is an electrode assembly and induction coil suitably carried by upper and lower plates of insulating material all housed within the chamber.

The assembly rests on a vibration absorbing annular cushion of cork in the base of the chamber, a collecting launder being mounted in this cushion at the foot of the cone to collect the treated liquid and pass it through a suitable pressure tight duct to the receiving vessel.

A pipe line or lines carrying a manometer or pressure vacuum gauge, opens communication between the interior of the chamber through control cocks to a suction pump or exhauster and to a cylinder for processing gas or selectively to cylinders containing different processing and/or inert gases.

The invention will now be further described with reference to the accompanying drawings where the specific embodiment aforementioned is illustrated diagrammatically by way of example and wherein.

Fig. 1 is an axial vertical section of the treatment chamber, header and receiving vessel and showing diagrammatically the associated exhauster and gas cylinder, while Fig. 2 is a detail view of a preferred form of interrupted segmental electrode.

Referring now to the drawings, I represents the header from which the liquid flows by gravity through a downcomer duct 2 regulated by a stop cock 3 to a bell mouth 4 whose function is to minimise or elminate turbulence and splashing of the flowing liquid.

5 represents the treatment chamber, suitably a cylindrical glass shell having a cap 6 with a central neck 7 in which the downcomer 2 is carried through the medium of gastight packing member 8.

9 is a glass cone located centrally and vertically within the chamber 5, the upper domed end of the cone being positioned immediately under the bell mouth 4 so that liquid issuing therefrom flows smoothly and uniformly as a continuous annular film down the external surface of the cone 9.

The base of the treatment chamber 5 is cupped at 10 and from this cupped portion depend two necked openings 11 and 12, the former passing a delivery tube 13 running from a launder 14 surrounding the base of the cone 9 to a receiving vessel 15, and the latter passing an evacuation and/or gas tube 16 which externally of the chamber is connected to a suction pump or exhauster 17 via control cocks 18 and 19 and through a branch 20 controlled by a cock 21 to a gas cylinder 22. The gas tube 16 also mounts a vacuum gauge 23.

Both tubes have appropriate gas tight packings 24 and 25 in their respective neck apertures, the packing 25 being shown also passing the lead-in conductor 26 for a central electrode 27 within the cone 9.

As aforementioned a head of liquid is maintained in the header 1 during treatment to provide a liquid seal and a similar seal is provided on the delivery tube 13 by continuing it downwardly below the level of treated lquid indicated at 28 in the receiving vessel 15 from which the liquid may be drawn off via a conduit 29 controlled by a stop cock 30.

A branch 31 on the gas duct 16 enables the receiving vessel 15 to be connected to the exhauster 17 or to the gas cylinder 22 as desired.

With the exception of the central electrode 27 inside the hollow cone 9, the electrical assembly within the treatment chamber 5 is carried by a pair of centrally perforated discs 35 and 36 of appropriate insulating material, the lower disc resting on an annular cushion ring 37 of cork fitting in the cupped base 10 of the chamber.

The discs 35 and 36 are bridged by tie bolts 38 and between the discs is a second electrode 39 suspended by studs 40 from the upper disc 35 and an annular induction coil 41 surrounding the treatment zone proper within the chamber 5.

42 represents the lead for the electrode 39, and 43 and 44 the leads for the coil 41.

A preferred form of the electrode 39 is illustrated in Fig. 2, two of the studs 40 extending downwardly at 45 for the full depth of the electrode, which consists of a plurality of D shaped part-cylindrical sections 46, spaced from each other and assembled in staggered relation on the studs to form what is in effect a perforate cylinder around the cone 9 down which the liquid flows through the treatment zone.

The edges of the sections 46 are advantageously serrated or milled as shown at 47 to induce a corona discharge effect in operation and as will be appreciated, the electrode assemblies are readily interchangeable for sets of a different metal where oligo-dynamic treatment is intended, e. g. nickel, zinc, silver, thorium or impregnated metals, and/or alloys of alkaline metals, e. g. thoriated nickel, borated copper and the like. The electrodes may all be of the same metal, or pairs of different metals may be employed.

Advantageously, the electrodes are prepared by the deposition of the chosen metal on a dielectric base, e. g. glass or fused silica, or such deposition is effected on the walls of the glass cylinder itself. The range of the voltage applied to the electrodes 27 and 39 is 500 to 10,000.

The discharge path between the electrodes, across the inner space of the processing vessel is approximately about 8 cm. so that discharge potentials up to 600 volts per cm. can be maintained. The solenoid 41 is a close fitting magnetising coil with a normal output of 500 kilowatts.

The purpose of the magnetising coil is to influence both the conditions of electric discharge from the electrodes themselves, as the film passes through the chamber during the electric discharge, and the effect such discharge has on the material. As will be appreciated, the electro-magnetic field may be employed without the electrodes being charged.

In practice it has been found convenient to first evacuate the treatment chamber 5 by the exhauster 17 and then after closing the cock 19 and opening the gas cock 21 introduce a proportion of the selected processing gas from the cylinder 22 which reduces the degree of vacuum shown on the gauge 23 to the order of 20–24 mm. mercury.

It will be appreciated that the apparatus may be employed to effect changes in liquids by ionisation, oligo-dynamic action or other electrical activation.

What we claim is:

1. Apparatus for subjecting liquid material to electrical treatment, comprising a closed treatment chamber, means for feeding the liquid material to the treatment chamber, means for collecting the treated material therefrom, means for reducing the pressure in such chamber in combination with means for introducing a processing gas into the chamber while a reduced pressure is maintained therein during the flow of the material therethrough in contact with the processing gas, an inner electrode, a tubular partition of dielectric material surrounding said inner electrode and over which the liquid material flows as a film during treatment, an outer interrupted electrode surrounding said partition and composed of spaced staggered arcuate plates coaxially disposed, and an induction coil surrounding said outer electrode within the chamber.

2. Apparatus for subjecting liquid material to electrical treatment, comprising a closed treatment chamber, means for feeding the liquid material to the treatment chamber, means for collecting the treated material therefrom, means for reducing the pressure in such chamber in combination with means for introducing a processing gas into the chamber while a reduced pressure is maintained therein during the flow of the material therethrough in contact with the processing gas, an inner electrode, a tubular partition of dielectric material surrounding said inner electrode and over which the liquid material flows as a film during treatment, an outer interrupted electrode surrounding said partition and composed of spaced staggered, part cylindrical plates coaxially disposed and having serrated edges, and an induction coil surrounding said outer electrode within the chamber.

3. Apparatus for subjecting liquid material to electrical treatment, comprising a closed treatment chamber, means for feeding the liquid material to the treatment chamber, means for collecting the treated material therefrom, means for reducing the pressure in such chamber in combination with means for introducing a processing gas into the chamber while a reduced pressure is maintained therein during the flow of the material therethrough in contact with the processing gas, an inner electrode, a tubular partition of dielectric material surrounding said inner electrode and over which the liquid material flows as a film during treatment, an outer interrupted electrode surrounding said partition and composed of spaced staggered arcuate plates coaxially disposed, an induction coil surrounding said outer electrode within the chamber, plates of insulating material above and below said electrode and coil upon which they are mounted as a unitary sub-assembly for insertion in the chamber, and a vibration absorbing annular cushion in the base of the chamber on which cushion the sub-assembly rests.

ARTHUR M. J. JANSER.
CHARLES S. TOWNSEND.

REFERENCES CITED

The following references are of record in the file of this patent:

UNITED STATES PATENTS

| Number | Name | Date |
|---|---|---|
| 653,078 | Elworthy | July 3, 1900 |
| 743,432 | Blackmarr et al. | Nov. 10, 1903 |
| 1,050,260 | Walden | Jan. 14, 1913 |
| 1,334,962 | Niece et al. | Mar. 30, 1920 |
| 1,505,669 | Quain | Aug. 19, 1924 |
| 1,768,891 | Davis et al. | July 1, 1930 |
| 1,875,671 | Sola | Sept. 6, 1932 |
| 2,262,995 | Ferrari et al. | Nov. 18, 1941 |
| 2,364,940 | Bies | Dec. 12, 1944 |
| 2,408,908 | Borchardt | Oct. 8, 1946 |